United States Patent [19]

Zimmerman

[11] Patent Number: 4,580,767

[45] Date of Patent: Apr. 8, 1986

[54] ELECTRIC FENCE INCLUDING A RIBBED TUBULAR SLEEVE INSULATOR

[75] Inventor: Robert E. Zimmerman, New Concord, Ohio

[73] Assignee: Lifetime Fence Company, Concord, Ohio

[21] Appl. No.: 687,736

[22] Filed: Dec. 31, 1984

[51] Int. Cl.[4] .......................... A01K 3/00; H01B 17/16; H01B 17/58

[52] U.S. Cl. .................................. 256/10; 174/158 F; 174/164; 174/167; D13/18

[58] Field of Search .................... 174/152 G, 154, 155, 174/158 F, 159, 161 F, 163 F, 164, 167; 138/177, DIG. 11; 256/10; 336/208; 338/321; D13/17, 18

[56] References Cited

U.S. PATENT DOCUMENTS

| | | | |
|---|---|---|---|
| 517,591 | 4/1894 | Robinson | 174/152 G |
| 660,140 | 10/1900 | Alley | 174/155 |
| 1,158,105 | 10/1915 | Callender | 174/152 G |
| 3,377,054 | 4/1968 | Thron | 174/158 F X |
| 4,355,201 | 10/1982 | Wilson, Sr. | 174/158 F X |

FOREIGN PATENT DOCUMENTS

| | | | |
|---|---|---|---|
| 219501 | 5/1957 | Australia | 174/158 F |
| 1234821 | 2/1967 | Fed. Rep. of Germany | 174/68 C |
| 2714227 | 10/1978 | Fed. Rep. of Germany | 174/152 G |
| 701872 | 1/1954 | United Kingdom | 174/209 |
| 866952 | 5/1961 | United Kingdom | 336/208 |

OTHER PUBLICATIONS

FENCE SYSTEM DESIGN HANDBOOK, Lifetime Fence Co., New Concord, Ohio, Copyright 1982, cover page and pp. 1–9.

*Primary Examiner*—Laramie E. Askin
*Attorney, Agent, or Firm*—Michael Sand Co.

[57] ABSTRACT

An insulator for supporting a conductor of an electric fence on a support post in which the insulator is an elongated sleeve formed of a dielectric plastic material. The sleeve has a bore which slidably receives the conductor therein and is formed with a plurality of ribs which extend longitudinally along the conductor and in a radially outwardly extending direction. The ribs are formed integrally with the sleeve and of the same dielectric plastic material. Two of the ribs abut against the fence post to position the sleeve whereby at least one of the ribs extends outwardly from the sleeve. This outer rib is indented by the web portion of an attachment staple, the legs of which are embedded in the post and trap the sleeve therebetween. This indentation of the outer rib prevents the sleeve from sliding along the conductor and out of contact with the post without the use of any fasteners that pierce the insulator sleeve body.

3 Claims, 6 Drawing Figures

ELECTRIC FENCE INCLUDING A RIBBED TUBULAR SLEEVE INSULATOR

TECHNICAL FIELD

The invention relates to securing devices, and more particularly to an insulator for supporting an electric wire on a fence post or the like. Even more particular, the device relates to an insulator sleeve having retention means which interacts with an attachment staple to prevent the sleeve from sliding along a conductor extending through the sleeve and out of insulating contact with the fence post.

BACKGROUND ART

Electric fences have been used for a considerable number of years for restraining cattle, sheep, horses and similar animals in a confined area. The electric fence consists of one or a plurality of vertically spaced conductors which are mounted on a plurality of spaced posts which extend about the periphery of the protected area. An electric charge is placed on the fence conductors so that the animal upon contacting the conductors will experience a sufficient shock to prevent it from attempting to leave the protected area. These conductors are mounted on spaced posts which are formed of either metal or wood by dielectric insulators. These insulators are formed of various dielectric material such as porcelain and certain plastics which electrically insulate the conductor from the posts. These insulators have taken various configurations and constructions. Examples of certain types of electric fence insulators are shown in U.S. Pat. Nos. 3,377,054 and 4,355,201.

A common type of electric fence insulator consists of an elongated sleeve of dielectric material, such as a high density polyester or polyethylene, which is formed with a central opening through which the conductor is inserted. The insulator sleeve is attached to a post by U-shaped staples or other means whereby the web portion of the staple presses against the sleeve body to maintain the conductor and sleeve on the post. Problems occur with such sleeve insulators and the mounting thereof such as over a period of time, the insulator sleeve may slide along the internal conductor and out of contact with the support post allowing the conductor to contact the post resulting in a grounded conductor with resultant problems.

To eliminate or reduce this unwanted movement of the sleeve insulator, the installer will drive the staple sufficiently far into the post so that the web of the staple indents into the body of the sleeve. This results in a weakened area in the insulator sleeve which ultimately can rupture or crack permitting the staple to contact the interior electrical conductor. Sliding movement of the conductor within the sleeve is not critical but the sleeve must be prevented from such sliding movement with respect to the attachment post. Other insulator constructions will use attachment means, usually nails or staples that pierce portions of the insulator such as shown in U.S. Pat. No. 4,355,201 to prevent such movement of the insulator on the post. However, these insulators are more expensive to produce than the tubular sleeve style of insulator and require additional time to install.

Although these prior art insulator sleeves have performed satisfactorily, they do possess a disadvantage in that they are difficult to properly install on the fence posts to insure that the sleeve will not slide along the post without damaging or materially weakening the sleeve body.

Therefore, the need has existed for an improved insulating sleeve for an electric fence formed of a dielectric material which enables the sleeve to be properly installed on a supporting pole without damaging the sleeve material, and which prevents the sleeve from moving along the pole over extended period of use.

DISCLOSURE OF THE INVENTION

Objectives of the invention include providing an improved insulator for an electric fence which is formed of a dielectric plastic material, such as high strength polyethylene or polyester, which has a central bore through which an electrical conductor is inserted, and in which a plurality of ribs are formed integrally with the sleeve to prevent the sleeve from sliding on the fence post when properly installed. Another objective is to provide such an insulator in which certain of the sleeve ribs position the insulator on the post so that another of the ribs extends in an outward direction and is indented by the web by a U-shaped staple, the legs of which are driven into the post to trap the insulator sleeve therebetween; and in which the web's indentation of the rib prevents sliding movement of the sleeve along the post without damaging in any manner the sleeve body.

A still further objective of the invention is to provide such ribbed insulator sleeve in which three or more ribs are formed on the sleeve body and are equally spaced circumferentially about the body for use in positioning the sleeve on the post and for indentation by the attaching staple; and in which the ribs are molded integrally with the sleeve body by an injection molding process thereby eliminating any additional manufacturing steps; and in which the sleeve eliminates the need of the attaching staples or nails from piercing portions of the insulator as in prior insulator constructions. Still another objective is to provide such an improved insulator which is of a durable and rugged construction, which has increased life span, which reduces insulation failure, and which solves existing problems, satisfies needs and obtains new results in the art.

These objectives and advantages are obtained by the improved insulator which is used for attaching a conductor to a supporting structure in which the general nature of said insulating construction may be stated as including a sleeve formed of an electric insulating material having a longitudinally extending bore and at least three ribs formed integrally with the sleeve and spaced about said sleeve; said ribs extending along a portion of the sleeve and generally radially outwardly of the sleeve with two of said ribs being adapted to abut against the supporting structure positioning another of the ribs at a generally diametrically opposite portion of the sleeve whereby said other rib is indented by a staple which attaches the sleeve and conductor to the supporting structure.

BRIEF DESCRIPTION OF THE DRAWINGS

A preferred embodiment of the invention, illustrative of the best mode in which applicant has contemplated applying the principles, is set forth in the following description and is shown in the drawing and is particularly and distinctly pointed out and set forth in the appended claims.

Similar numerals refer to similar parts throughout the drawings.

BEST MODE FOR CARRYING OUT THE INVENTION

Figure 1:
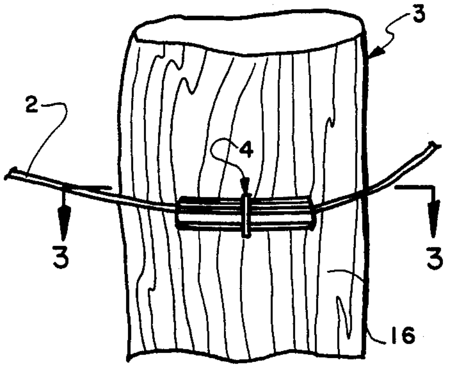
FIG. 1 is a fragmentary perspective view of the improved insulator mounting an electrical conductor on a fence post.
Figure 2:
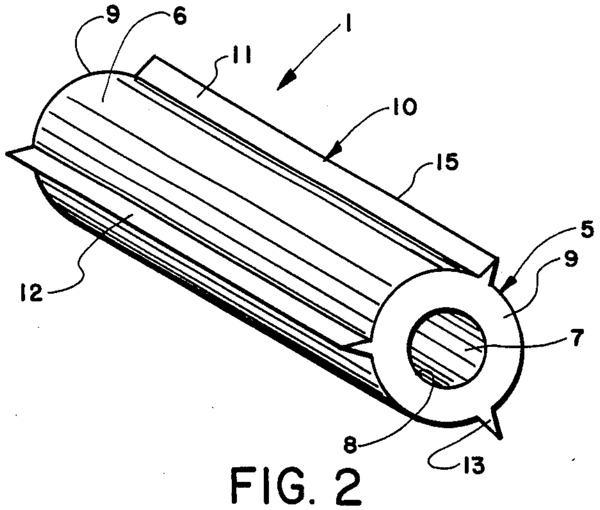
FIG. 2 is an enlarged perspective view of the improved insulator.
Figure 3:
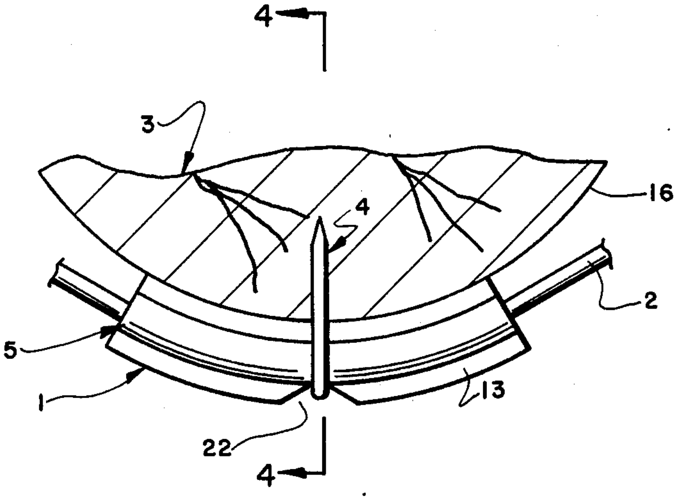
FIG. 3 is an enlarged fragmentary sectional view taken on line 3—3, FIG. 1.
Figure 4:
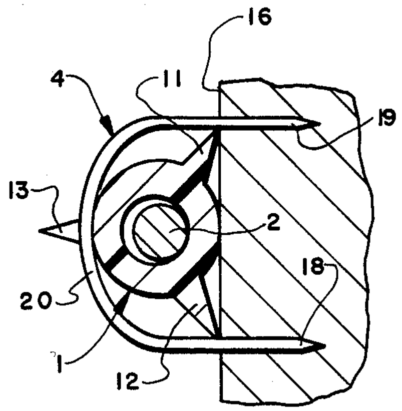
FIG. 4 is an enlarged fragmentary sectional view taken on line 4—4, FIG. 3.

The improved insulator construction is indicated generally at 1, with the structure thereof being shown particularly in FIG. 2 and its manner of use being shown in FIGS. 1, 3 and 4. Insulator 1 is shown mounting an electrical conductor 2 on a fence post 3 by an attachment staple 4 in FIGS. 1, 3 and 4.

Insulator 1 includes a tubular sleeve body indicated generally at 5 having an outer cylindrical surface 6, and an inner cylindrical surface 7 which forms a hollow internal bore 8 which extends throughout the length of body 5. The ends of body 5 terminate in annular surfaces 9. Bore 8 is generally complementary with the diameter of electrical conductor 2 which usually will be circular in cross section and which is adapted to be slid through bore 8 with the insulator being moved along until the conductor reaches the desired fence post 3.

In accordance with the main feature of the invention, a plurality of ribs, each of which is indicated generally at 10, are formed on sleeve body 5. Three ribs are shown for the embodiment of FIG. 2 and are indicated specifically by numerals 11, 12 and 13. Ribs 10 are formed integrally with sleeve body 5 and preferably are extrusion molded of plastic which has sufficient dielectric properties to provide the desired amount of electrical insulation such as various types of polyethylene, polyester or the like currently being used for sleeve insulators.

Each rib 10 preferably will have a triangular cross-sectional configuration terminating in a peak or apex 15 with the base being integral with outer surface 6 of sleeve body 5. In the particular embodiment shown in FIG. 2, three ribs 10 are formed integrally with sleeve 6 and are equally spaced about the circumference at 120° with respect to each other. In this embodiment, sleeve 5 has a length of approximately 4 inches and an outer diameter of approximately 5/16 inch, and ribs 10 have a vertical height of approximately 3/32 inch, with a base of approximately 1/16 inch. These dimensions may vary if desired without affecting the concept of the invention.

Fence post 3 usually is formed of wood and will be circular or rectangular in cross section. When installing insulator 1 on post 3, any two of ribs 10 are placed against outer surface 16 of post 3 as shown particularly in FIG. 4, whereby the third rib 13 extends in a generally perpendicular outwardly direction with respect to post surface 16.

Staple 4 is generally U-shaped having a pair of spaced legs 18 and 19 connected by a web 20. Web 20 may be curved as shown in the drawings or may be straight for some staples joining legs 18 and 19 at right angles. Either staple will work satisfactorily with insulator 1.

An installer will merely drive staple 4 into the fence post in the usual manner with the legs becoming embedded the post material whereupon staple web 20 will crush or deform a portion of rib 13 forming an indentation or groove 22 therein as shown in FIG. 3. Staple 4 preferably is driven an amount into post 3 until web 20 abuts against outer surface 6 of sleeve 5 as shown in FIG. 4, which will provide a sufficiently deep indentation 22 in rib 13 preventing any sliding movement of the insulator along conductor 2 and out of contact with post 3 without damaging or indenting the sleeve body. The triangular configuration of rib 10 enables web 20 to indent the rib easily until contacting the outer surface 6 of body 5.

This attachment procedure is extremely simple and is the normal procedure followed by an installer when a usual smooth cylindrical insulator is used of a prior art construction. However, with improved insulator 1 the outer surface of sleeve body 5 is not indented or grooved by the staple as sometimes occurs in prior constructions in order to prevent lateral movement of the insulator along the conductor. The installer can visually determine very easily that the staple has reached the preferred depth preventing damage to body 5. Insulator 1 performs satisfactorily for angles or curves in the line as shown in FIG. 3, as well as at straight line attachment posts.

Figure 5:
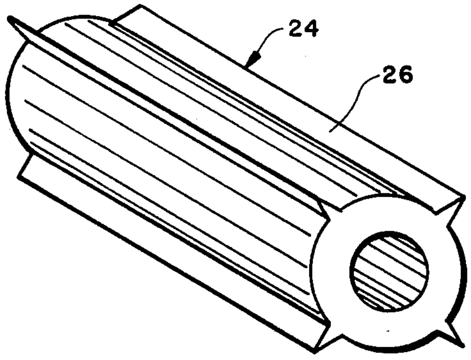
FIGS. 5 and 6 are enlarged perspective views similar to FIG. 2, showing two additional modifications of the improved insulator.
Figure 6:
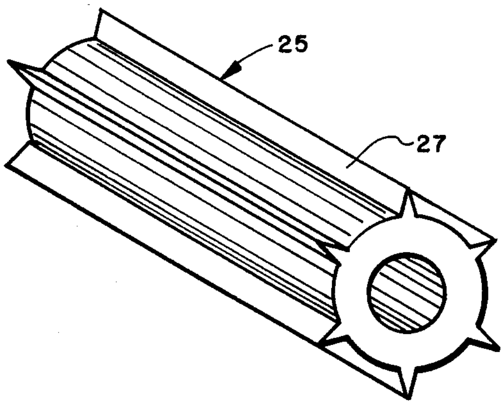

In the preferred embodiment three equally spaced ribs 10 are used, two of which provide the positioning of the insulator on the post so that the third rib is correctly positioned for indentation by a driven staple. FIGS. 5 and 6 show modifications to insulator 1 and are indicated generally at 24 and 25, respectively. Embodiment 24 shown in FIG. 5 uses four equally spaced ribs 26, preferably of the same size and configuration of ribs 10 described above, whereas embodiment 25 uses six equally spaced ribs 27 also similar to ribs 10. In either embodiment 24 or 25 two of the ribs will provide the positioning means upon engagement with post 3 with one or more of the outer ribs being positioned for engagement with the staple web.

With the four rib configuration of FIG. 5, the staple web will only engage a portion of the outer ribs 26 and preferably a staple will be used whereby the spacing of the legs is small enough so that the legs themselves will form indentations in the outermost pair or ribs. However, both embodiments follow the principle of the invention, that is, an insulator sleeve having at least three ribs molded integrally therewith, two of which provide the positioning on the post whereby at least one or more of the other ribs extend outwardly to become indented, preferably by the staple web or in some situations the staple legs themselves, upon the staple being driven into the post to mount the insulator thereon. However, the three ribbed construction of FIG. 2 is the preferred embodiment and most economical because only three ribs are required and these three ribs provide the desired positioning feature as well as the outer location of the outer rib which is indented by the staple web.

Ribs 10, 26 and 27 extend along sleeve body 5 parallel with bore 8 and generally throughout the length of the sleeve, although the shorter length rib could be used and still provide the same advantages. However, the continuous extrusion of lengths of material which are subsequently cut into the desired insulator length facilitates the forming of the ribs simultaneously with the extrusion forming of the main body so that the ribs have the same length as body 5. Also, the relatively small size of the ribs increases very slightly the amount of dielectric material required in the extrusion forming of the insulator.

Another feature of the invention is that the staple or other attachment means does not pierce any part of the insulator for securing it to the post except for the indentation of one or more of the retaining ribs. Thus, no attachment holes must be formed during the manufacture of the insulator which increases considerably the manufacturing costs as well as providing an area on the insulator which is subject to deterioration and breakage as in some types of prior insulator constructions.

The improved insulator for an electric fence or other electrical conductor provides a device which enables it to be directly installed on a fence post whereby the conductor is properly aligned on the post and the insulator is prevented from sliding along the insulator possibly becoming disengaged from the post causing a short circuit between the conductor and post.

Accordingly, the improved electric fence insulator and electric fence construction achieved therewith is simplified, provides an effective, safe, inexpensive and efficient device which achieves all of the enumerated objectives, provides for eliminating difficulties encountered with prior insulators, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved electric fence insulator is constructed and used, the characteristics of the construction, and the advantageous, new and useful results obtained; the new and useful structures, devices, elements, arrangements, parts, and combinations are set forth in the appended claims.

What is claimed is:

1. An improved electric fence including:

(a) an electric conductor;

(b) a post;

(c) a one piece insulator formed of a dielectric plastic material mounting the electric conductor on the post; said insulator including a tubular sleeve body having a longitudinally extending bore with the conductor being slidably received within said bore, three ribs formed integrally with and spaced equally circumferentially about the sleeve body and extending continuously along said body and projecting generally radially outwardly therefrom, two of said ribs abutting against the post positioning a third rib in an outwardly extending direction generally perpendicular with respect to the post; and (d) a generally U-shaped staple embedded in the post attaching the insulator sleeve body to said post with a portion of said staple indenting the third rib to reduce sliding movement of the sleeve body on said post.

2. The improved electric fence defined in claim 1 in which the insulator is approximately four inches long, has an outer diamter of approximately 5/16 inch, and in which the ribs extend radially outwardly a distance of approximately 3/32 inch from the sleeve.

3. An improved electric fence including:

(a) an electric conductor;

(b) a post;

(c) a one piece insulator formed of a dielectric plastic material mounting the electric conductor on the post; said insulator including a tubular sleeve body having a longitudinally extending bore with the conductor being slidably received within said bore, at least three ribs formed integrally with and spaced circumferentially about the sleeve body and extending continuously along said body and projecting generally radially outwardly therefrom, two of said ribs abutting against the post positioning a third rib in an outwardly extending direction with respect to the post; and (d) a generally U-shaped staple embedded in the post attaching the insulator body to said post with a portion of said staple indenting the third rib to reduce sliding movement of the sleeve body on said post.

* * * * *